(12) United States Patent
Shinohara et al.

(10) Patent No.: US 7,473,449 B2
(45) Date of Patent: Jan. 6, 2009

(54) LIQUID CRYSTAL PANEL AND ELECTRONIC APPARATUS

(75) Inventors: Yuji Shinohara, Suwa (JP); Koichi Terao, Suwa (JP)

(73) Assignee: Seiko Epson Corporation (JP)

( * ) Notice: Subject to any disclaimer, the term of this patent is extended or adjusted under 35 U.S.C. 154(b) by 253 days.

(21) Appl. No.: 11/440,973

(22) Filed: May 25, 2006

(65) Prior Publication Data

US 2006/0286310 A1 Dec. 21, 2006

(30) Foreign Application Priority Data

Jun. 20, 2005 (JP) ............... 2005-178964

(51) Int. Cl.
*G02F 1/1337* (2006.01)
(52) U.S. Cl. ...................... 428/1.2; 349/125
(58) Field of Classification Search ............ 428/1.2; 349/123–135

See application file for complete search history.

(56) References Cited

U.S. PATENT DOCUMENTS

| | | | | |
|---|---|---|---|---|
| 4,030,997 A | * | 6/1977 | Miller et al. | ........... 204/192.34 |
| 5,011,267 A | * | 4/1991 | Miller et al. | ............... 349/125 |
| 5,350,498 A | * | 9/1994 | Smith et al. | ........... 204/192.23 |

FOREIGN PATENT DOCUMENTS

| | | |
|---|---|---|
| GB | 2356942 A | 6/2001 |
| JP | 05-203958 | 8/1993 |
| JP | 11-160711 | 6/1999 |
| JP | 2000-047211 | 2/2000 |

OTHER PUBLICATIONS

US Department of Labor, OSHA, Chemical Sampling Information, Octadecanol, Jun. 1992.*
NIOSH Pocket Guide to Chemical Hazards, Methyl alcohol, Sep. 2005.*

* cited by examiner

*Primary Examiner*—Keith D Hendricks
*Assistant Examiner*—Sophie Hon
(74) *Attorney, Agent, or Firm*—Harness, Dickey & Pierce, P.L.C.

(57) ABSTRACT

A liquid crystal panel includes a first substrate; a second substrate which opposes to the first substrate; a first alignment film which is provided on the first substrate; a second alignment film which is provided on the second substrate; and a liquid crystal layer which is interposed between the first alignment film and the second alignment film. The first alignment film and the second alignment film are formed by an oblique deposition method, and are formed by chemically bonding alcohols to a hydroxyl group which exists on at least a surface of an inorganic oxide film having a plurality of micropores, and the average molecular weight of alcohols of the first alignment film is different from the average molecular weight of alcohols of the second alignment film.

10 Claims, 4 Drawing Sheets

LIQUID CRYSTAL PANEL AND ELECTRONIC APPARATUS

BACKGROUND

1. Technical Field

The present invention relates to a liquid crystal panel and an electronic apparatus.

2. Related Art

In recent years, a homeotropically aligned liquid crystal display element (liquid crystal panel) has been put to practical use in a liquid crystal television (direct view type display device), a liquid crystal projector (projection type display device), etc.

As an example of homeotropic alignment film used for the homeotropically aligned liquid crystal element, an organic alignment film such as polyimid is used for the liquid crystal television, and an oblique deposition film (inorganic alignment film) such as $SiO_2$ is widely used for the liquid crystal projector.

The oblique deposited film made of an inorganic oxide has a plurality of micropores, and a plurality of polarized hydroxyl groups exist on a surface thereof and inner surfaces of the micropores. The hydroxyl groups have an activity as Bronsted acid sites so that impurities included in liquid crystal molecules or the liquid crystal display element, especially, a compound with a polar group can be easily adsorbed thereto or reacted therewith.

Here, the impurities include an impurity in a sealant, an unreacted component, an impurity on a liquid crystal layer, moisture, dirt attached during a manufacturing process, etc.

There is known that when the impurities are adsorbed or reacted on the surface of the oblique deposition film, the polarity or shape of the surface is varied to decrease the vertical anchoring force and to occur an abnormal alignment of liquid crystal molecules. Further, the liquid crystal molecules are known to directly and chemically react with the hydroxyl group.

In this case, as a method of modifying the surface of the oblique deposition film (inorganic oxide film), a method of treating the hydroxyl group on the surface of the inorganic alignment film with a higher alcohol is proposed (for example, see JP-A-11-160711).

According to the method described in JP-A-11-160711, a $SiO_2$ oblique deposition film is exposed to the vapor of the higher alcohol. Therefore, the above treatment is performed on two opposing alignment films under the same condition.

However, in the liquid crystal display element, since the alignment film on an incident side and the alignment film on the outgoing side have different requirements, it is difficult to satisfy both requirements. Moreover, according to the liquid display element described in JP-A-11-160711, it is difficult to satisfactorily improve the property thereof.

SUMMARY

An advantage of some aspects of the invention is that it provides a liquid crystal panel and an electronic apparatus which has an excellent light resistance and in which burn-in phenomenon hardly occurs.

According to a first aspect of the invention, liquid crystal panel includes a first substrate; a second substrate which opposes to the first substrate; a first alignment film which is provided on the first substrate; a second alignment film which is provided on the second substrate; and a liquid crystal layer which is interposed between the first alignment film and the second alignment film.

The first alignment film and the second alignment film are formed by an oblique deposition method, and are formed by chemically bonding alcohols to a hydroxyl group which exists on at least a surface of an inorganic oxide film having a plurality of micropores.

The average molecular weight of alcohols of the first alignment film is different from the average molecular weight of alcohols of the second alignment film.

Therefore, the light resistance is excellent and the burn-in phenomenon hardly occurs.

In the liquid crystal panel according to the above aspect, the first substrate may include a driving element. It is preferable that the average molecular weight of alcohols of the first alignment film is larger than the average molecular weight of alcohols of the second alignment film.

Therefore, the light resistance is excellent and the burn-in phenomenon hardly occurs.

In the liquid crystal panel according to the above aspect, the average molecular weight of alcohols of the first alignment film may be 100 to 400.

Therefore, it is possible to reliably extend the time required for abnormal alignment, that is, reliably improve the light resistance (durability).

In the liquid crystal panel according to the above aspect, of the first alignment film may mainly have alcohols having 6 to 30 carbon atoms.

Therefore, the effect of improving the durability is remarkable.

In the liquid crystal panel according to the above aspect, the average molecular weight of alcohols of the second alignment film may be 32 to 70.

Therefore, it is possible to reliably prevent the burn-in phenomenon.

In the liquid crystal panel according to the above aspect, the second alignment film may mainly have an alcohol having 1 to 4 carbon atoms.

Therefore, the effect of preventing the burn-in phenomenon is remarkable.

In the liquid crystal panel according to the above aspect, in both the first alignment film and the second alignment film, the alcohols may be chemically bonded to a hydroxyl group which exists in an inner surface of the micropores of the inorganic oxide film.

Therefore, the durability and the effect of preventing the burn-in phenomenon can be more improved.

In the liquid crystal panel according to the above aspect, at least one of the alcohol of the first alignment film and the alcohol of the second alignment film may have a plurality of types of alcohols.

For example, when combining the alcohol having a high molecular weight and the alcohol having a low molecular weight, it is possible to chemically bond the alcohol to both the hydroxyl group between the alcohols having a high molecular weight and the hydroxyl group which exists at the rear side of the micropores. Therefore, it is possible to reliably reduce the amount of the hydroxyl group which remains on the inorganic oxide film.

In the liquid crystal panel according to the above aspect, any one of the alcohol of the first alignment film and the alcohol of the second alignment film may have a plurality of types of alcohols, and the other may have one type of alcohol.

The alcohol of the one alignment film may have the same type of alcohol as the other alignment film.

Accordingly, it is possible to adjust the vertical anchoring force with respect to the liquid crystal molecules which is suitable for preventing the burn-in phenomenon.

In the liquid crystal panel according to the above aspect, both the alcohol of the first alignment film and the alcohol of the second alignment film may have a plurality of types of alcohols, and the alcohol of the first alignment film and the alcohol of the second alignment film may have the same type of alcohol.

Accordingly, it is possible to adjust the vertical anchoring force with respect to the liquid crystal molecules which is suitable for preventing the burn-in phenomenon.

According to another aspect of the invention, an electronic apparatus includes the liquid crystal panel according to the above aspect.

Therefore, it is possible to obtain an electronic apparatus with a higher reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a liquid crystal panel and an electronic apparatus of the invention will be described in detail with reference to the accompanying drawings.

Figure 1:
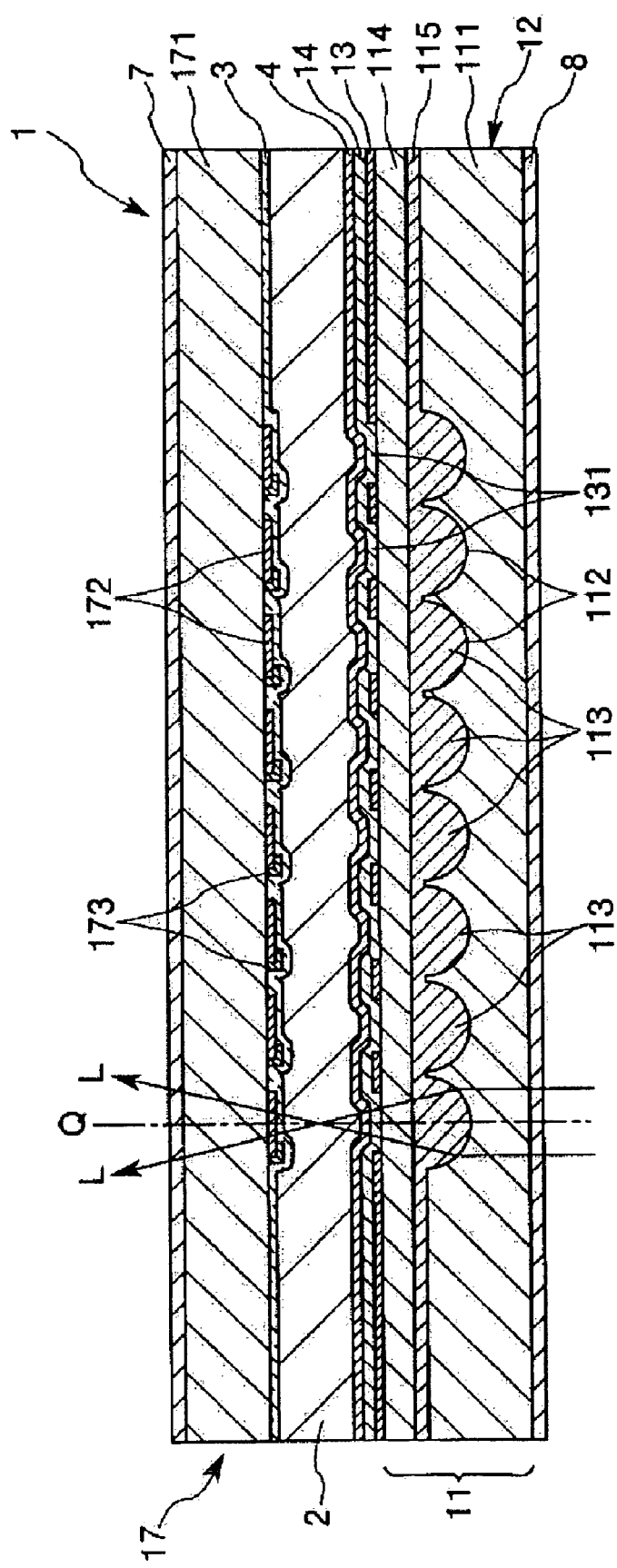
FIG. 1 is a vertical cross sectional view showing an embodiment of a liquid crystal panel.
Figure 2:
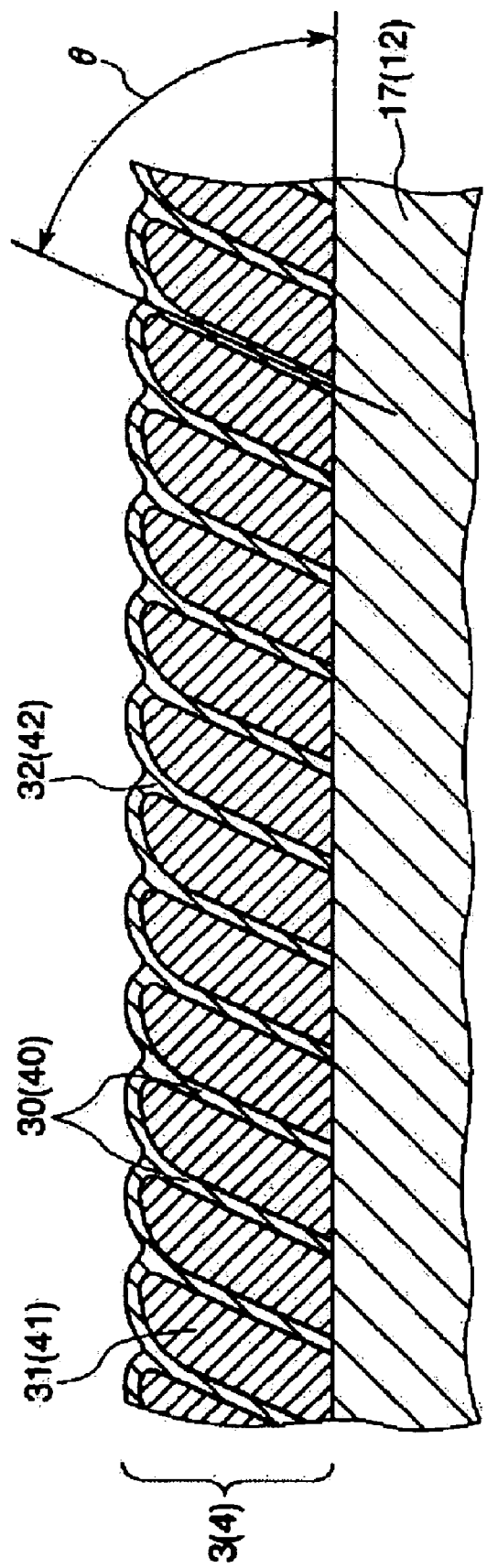
FIG. 2 is a vertical cross sectional view showing a construction of an alignment film provided in the liquid crystal panel shown in FIG. 1.

FIG. 1 is a vertical cross sectional view showing the liquid crystal panel according to an embodiment of the invention, and FIG. 2 is a vertical cross sectional view showing by enlarging an alignment film provided in the liquid crystal panel shown in FIG. 1. In FIG. 1, a sealing material and wiring lines are not shown. Further, in the following description, the upper portions and lower portions of FIGS. 1 and 2 are referred to as 'upper' and 'lower', respectively.

The liquid crystal panel (TFT liquid crystal panel) 1 shown in FIG. 1 includes a TFT substrate (liquid crystal driving substrate) 17, an alignment film 3 adhered to the TFT substrate 17, a counter substrate for a liquid crystal panel 12 (hereinafter, referred to as a counter substrate), an alignment film 4 adhered to the counter substrate 12, a liquid crystal layer 2 having liquid crystal molecules which are sealed in a gap between the alignment films 3 and 4, a polarizer 7 adhered to an outer surface (upper surface) of the TFT substrate 17 (liquid crystal driving substrate), and a polarizer 8 adhered to an outer surface (lower surface) of the counter substrate 12.

The counter substrate 12 has a microlens substrate 11, a black matrix 13 which is provided on a surface layer 114 of the microlens substrate 11 and has openings 131 formed therein, and a transparent conductive film (common electrode) 14 that is provided on the surface layer 114 so as to cover the black matrix 13.

The microlens substrate 11 has a substrate 111 with a concave portion for microlens on which a plurality of concave portions 112 for microlens with concave curve are disposed, and the surface layer 114 adhered to a surface having a concave portion 112 of the substrate 111 with a concave portion for microlens by means of a resin layer (adhesive layer) 115.

On the resin layer 115, the microlens 113 is formed by a resin filled in the concave portion 112.

The substrate 111 with a concave portion for microlens is manufactured by using a planar base material (transparent substrate), and the plurality of concave portions 112 are formed on the surface of the substrate 111.

The concave portions 112 can be formed by a dry etching method, a wet etching method, or the like which uses a mask.

The substrate 111 with a concave portion for microlens is, for example, formed of glass, or the like.

It is preferable that a thermal expansion coefficient of the base material is substantially equal to a thermal expansion coefficient of a glass substrate 171 (for example, the ratio of the thermal expansion coefficient of the both is approximately 1/10 to 10). Therefore, in an obtained liquid crystal panel 1, it is possible to prevent warping, bending, peeling caused by the difference of the thermal expansion coefficients when the temperature is varied.

Based on the above description, it is preferable that the substrate 111 with a concave portion for microlens and the glass substrate 171 are formed of the same material. Therefore, the warping, bending, peeling, or the like caused by the difference of the thermal expansion coefficients when the temperature is varied can be satisfactorily prevented.

Specifically, for the TFT substrate 17 which will be described later, silica glass whose property hardly changes corresponding to the environment at the time of manufacturing is used. Therefore, the substrate 111 with a concave portion for microlens is preferably formed of the silica glass. As a result, it is possible to obtain the liquid crystal panel 1 whose stability is excellent and in which bending does not occur.

On the upper surface of the substrate 111 with a concave portion for microlens, a resin layer (adhesive layer) 115 that covers the concave portions 112 is provided.

A structural material of the resin layer 115 is filled in the concave portions 112 to form the microlens 113.

The resin layer 115 can be formed of a resin (adhesive) which has a reflective index higher than that of the structural material of the substrate 111 with a concave portion for microlens, and preferably, for example, formed of an acrylic resin, an epoxy resin, an ultraviolet curing resin such as an acryl epoxy, etc.

On the upper surface of the resin layer 115, the planar surface layer 114 is provided.

The surface layer (glass layer) 114 can be formed of glass. In this case, it is preferable that a thermal expansion coefficient of the surface layer 114 is substantially equal to that of the substrate 111 with a concave portion for microlens (for example, the ratio of the thermal expansion coefficient of the both is approximately 1/10 to 10). Thereby, the wrapping, bending, peeling caused by the difference of the thermal expansion coefficients of the surface layer 114 and the substrate 111 with a concave portion for microlens can be avoided. The above advantages can be efficiently obtained if the surface layer 114 and the substrate 111 with a concave portion for microlens are formed of the same material.

In order to obtain a required optical property, an average thickness of the surface layer 114 is generally, about 5 to 1000 μm, and is more preferably about 10 to 150 μm.

Further, the surface layer (barrier layer) 114 can be formed of ceramics. Examples of the ceramics include nitride ceramics such as AlN, SiN, TiN, BN, etc., oxide ceramics such as $Al_2O_3$, $TiO_2$, etc., and carbide ceramics such as WC, TiC, ZrC, TaC, etc.

When the surface layer 114 is formed of ceramics, even though an average thickness of the surface layer 114 is not particularly limited, the average width is preferably about 20 nm to 20 μm, and more preferably about 40 nm to 1 μm.

However, such a surface layer 114 can be omitted if necessary.

The black matrix 13 has a light shielding function, for example is formed of a metal such as Cr, Al, Al alloy, Ni, Zn, Ti and so on, or a resin in which carbon or titanium is dispersed.

The transparent conductive film 14 has a conductive property, and is formed of, for example, indium tin oxide (ITO), indium oxide (IO), tin oxide ($SnO_2$) and so on.

The TFT substrate 17 is suitable for driving (controlling alignment) the liquid crystal molecules of the liquid crystal layer 2, and includes a glass substrate 171, a plurality of pixel electrodes 172 which are provided on the glass substrate 171 and are arranged in a matrix, and a plurality of thin film transistors (TFTs) 173 which correspond to the respective pixel electrodes 172.

The glass substrate 171 is preferably formed of quartz glass for the above-mentioned reason.

The pixel electrodes 172 drives the liquid crystal molecules of the liquid crystal layer 2 by charging and discharging between the transparent conductive film 14 (common electrode) and the pixel electrodes 172. The pixel electrodes 172 are formed of, for example, the same material as that of the above-mentioned transparent conductive film 14.

Each of the thin film transistors 173 is connected to the corresponding pixel electrode 172 which is disposed close thereto. Further, the thin film transistors 173 are connected to a control circuit (which is not shown) to control a current to be supplied to the pixel electrodes 172. Thus, the charging and discharging of the pixel electrodes 172 is controlled.

A polarizer (polarizing plate, polarizer) 7 is disposed on an outer surface (upper portion in FIG. 1) of the TFT substrate 17. In a similar way, another polarizer (polarizing plate, polarizer) 8 is disposed on an outer surface (lower portion in FIG. 1) of the counter substrate 12.

The polarizers 7 and 8 are formed of, for example, polyvinyl alcohol (PVA), etc. Otherwise, the polarizers may be formed such that iodine is doped on the above-mentioned material. Further, the polarizers may use a film which is formed of the above-mentioned material and extends in a uniaxial direction.

By disposing these polarizers 7, and 8, it is possible to surely control a transmittance according to adjustment of amount of electrification.

Directions of polarizing axes of the polarizers 7 and 8 are determined depending on an alignment direction of the alignment films 3 and 4 (in this embodiment, at the time of applying a voltage).

The alignment film 3 which is attached to the pixel electrodes 172 is provided on the TFT substrate (first substrate) 17, and the alignment film 4 which is attached to the transparent conductive film 14 is provided on the counter substrate 12 (second substrate).

The liquid crystal layer 2 is interposed between the alignment films 3 and 4. The liquid crystal layer 2 contains liquid crystal molecules (liquid crystal material), and the alignment of the liquid crystal molecules changes according to the charging and discharging of the pixel electrodes 172.

Examples of liquid crystal molecules include a phenylcyclohexane derivative, a biphenyl derivative, a biphenylcyclohexane derivative, a terphenyl derivative, a phenyl ether derivative, a phenyl ester derivative, a bicyclohexane derivative, an azomethine derivative, an azoxy derivative, a pyrimidine derivative, a dioxane derivative and a cubane derivative. Examples also include liquid crystal molecules obtained by introducing a fluorine-based substituent such as a fluoro group, a trifluoromethyl group, a trifluoromethoxy group, a difluoromethoxy group into those derivatives.

As described below, when alignment films 3 and 4 are used, it is easy to homeotropically align the liquid crystal molecules, and examples of liquid crystal molecules suitable for homeotropic alignment include the following compounds represented by Chemical Formulas 1 to 3.

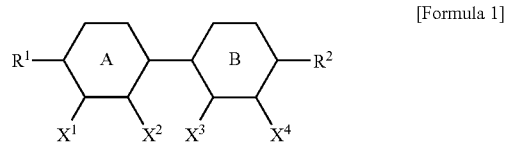
[Formula 1]

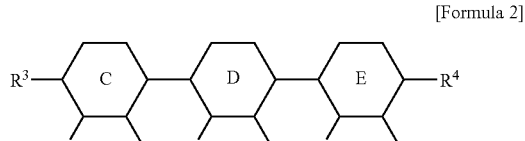
[Formula 2]

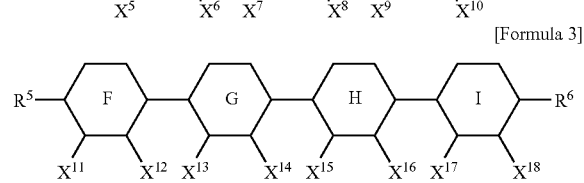
[Formula 3]

Wherein, rings A to I are each independently a cyclohexane ring or a benzene ring, $R^1$ to $R^6$ are each independently any one of an alkyl group, an alkoxy group or a fluorine atom, and $X^1$ to $X^{18}$ are each independently a hydrogen atom or a fluorine atom.

The alignment films (homeotropic alignment films) 3 and 4 has a function of adjusting the alignment state of the liquid crystal molecules of the liquid crystal layer 2 (when a voltage is not applied thereto).

The average thickness of the alignment films 3 and 4 is approximately 20 to 300 nm, preferably, 20 to 150 nm, and more preferably, 20 to 80 nm. When the thickness of the alignment films 3 and 4 is too small, the liquid crystal molecules are in directly contact with the transparent conductive film 14 and the pixel electrodes 172. Therefore, it is difficult to prevent short-circuit sufficiently. On contrary, when the thickness of the alignment films 3 and 4 is too large, the driving voltage of the liquid crystal panel 1 becomes high. Accordingly, the power consumption may increase.

The construction of the alignment films 3 and 4 will be described later.

In such a liquid crystal panel 1, one pixel generally includes one microlens 113, one opening 131 of the black matrix 13 corresponding to an optical axis Q of the microlens 113, one pixel electrode 172, one thin film transistor 173 connected to the pixel electrode 172.

An incident light L from the counter substrate 12 for a liquid crystal panel passes through the substrate 111 with a concave portion for microlens, is condensed while passing through the microlens 113, and transmits the resin layer 115, the surface layer 114, the opening 131 of the black matrix 13, the transparent conductive film 14, the liquid crystal layer 2, the pixel electrode 172, and the glass substrate 171.

At this time, since the polarizer 8 is provided at the incident side of the microlens substrate 11, the incident light L is linearly polarized when transmitting the liquid crystal layer 2.

In this case, the polarizing direction of the incident light L is controlled corresponding to the alignment state of the liquid crystal molecules of the liquid crystal layer 2. Therefore, by allowing the incident light L transmitted the liquid crystal panel 1 to transmit the polarizer 7, it is possible to control the brightness of emitting light.

As described above, the liquid crystal panel 1 has the microlens 113, and additionally the incident light L passed through the microlens 113 is condensed and passes through the opening 131 of the black matrix 13.

Meanwhile, in portions of the black matrix 13 at which the openings 131 are not formed the incident light L is shielded. Therefore, in the liquid crystal panel 1, leaking of unnecessary light from portions other than the pixels is prevented, and the attenuation of the incident light L in the pixel portions is suppressed. For this reason, the liquid crystal panel 1 has high transmittance in the pixel portions.

Each of the alignment films 3 and 4 is configured by an inorganic oxide film 31 (41) formed by an oblique deposition method and a coated film 32 (42) formed by performing a method as described later, as shown in FIG. 2.

Since the inorganic oxide film 31 (41) is formed by the oblique deposition method, as shown in FIG. 2, the inorganic oxide film has a plurality of micropores 30 (40), and the axis of each of the micropores 30 (40) is inclined with respect to a upper surface (a surface on which the alignment film 3 (4) is formed) of the TFT substrate 17 (counter substrate 12) to be uniaxially aligned.

The fact that the axis of each of the micropores 30 (40) is uniaxially aligned means that the axes of most of the micropores 30 (40) are oriented to a substantially equal direction (the average direction of the axes of the micropores 30 (40) is controlled). In this case, among the plurality of the micropores 30 (40), some of micropores 30 (40) may have an axis direction different from that of the most of micropores.

As described above, since the micropores 30 (40) is regularly arranged, the inorganic oxide film 31 (41) has a high structural regularity.

According to the above structure, it is easy to homeotropically align the liquid crystal molecules contained in the liquid crystal layer 2. Therefore, the alignment film 3 (4) formed as mentioned above is very useful for establishment of a VA (vertical alignment) type liquid crystal panel.

Further, since the alignment film 3 (4) has a high structural regularity, the alignment direction of the liquid crystal molecules can be more precisely controlled in a fixed direction (vertical direction). As a result, the performance (property) of the liquid crystal panel 1 can be improved.

An angle between the micropores 30 (40) and the upper surface of the TFT substrate 17 (counter substrate 12), which is not specifically limited, is preferably about 30 to 70°, more preferably about 40 to 60°. Accordingly, it is possible to homeotropically align the liquid crystal molecules more reliably.

The inorganic oxide film 31 (41) is a film formed of mainly an inorganic oxide. Generally, the inorganic material has more excellent chemical stability (photostability) than an organic material. Therefore, the inorganic oxide film 31 (41) has a more excellent light resistance than that of an alignment film containing an organic material.

Furthermore, the inorganic oxide film that forms the inorganic oxide film 31 (41) has a comparatively low dielectric constant which is preferable. Therefore, it is possible to effectively prevent burn-in phenomenon in the liquid crystal panel 1.

Examples of the inorganic oxide includes silicon oxides such as $SiO_2$, SiO, metal oxides such as $Al_2O_3$, MgO, TiO, $TiO_2$, $In_2O_3$, $Sb_2O_3$, $Ta_2O_5$, $Y_2O_3$, $CeO_2$, $WO_3$, $CrO_3$, $GaO_3$, $HfO_2$, $Ti_3O_5$, NiO, ZnO, $Nb_2O_5$, $ZrO_2$, $Ta_2O_5$, and among them, one or a combination of two or more kind selected therefrom can be used. Especially, it is preferable to mainly contain $SiO_2$ or $Al_2O_3$. $SiO_2$ or $Al_2O_3$ has a low dielectric constant and high photostability.

The coated film 32 (42) is formed along at least a surface (a surface and inner surface of the micropores 30 (40) in this embodiment) of the inorganic oxide film 31 (41).

The coated film 32 (42) is formed by treating the inorganic oxide film 31 (41) with a treatment solution which will be described later, that is, the coated film 32 (42) is formed by a chemical reaction (dehydrating condensation reaction) of an active hydroxyl group which exists in the surface of the inorganic oxide film 31 (41) and the inner surface of the micropores 30 (40) and a hydroxyl group of alcohol, and has mainly a main skeleton portion of an alcohol.

By forming the coated film 32 (42), it is possible to reduce the number of active hydroxyl groups which exist in the inorganic oxide film 31 (41), and further possible to prevent adhesion of impurities onto the inorganic oxide film 31 (41) and reaction of the inorganic oxide film 31 (41) with the liquid crystal molecules. Therefore, it is possible to prevent lowering in a vertical anchoring force of the alignment film 3 (4) against the liquid crystal molecules. As a result, it is possible to prevent abnormal alignment of the liquid crystal molecules.

Especially, in this embodiment, since the alcohol is chemically bonded to a hydroxyl group existing on the inner surface of the micropores 30 (40), the effect is more remarkable.

In this invention, the average molecular weights of alcohol of the alignment films 3 and 4 which are chemically bonded to the inorganic oxide films 31 and 41 are different from each other.

In this embodiment, the average molecular weight of alcohol of the alignment film 3 which is close to the TFT substrate 17 is larger than the average molecular weight of alcohol of the alignment film 4 which is close to the counter substrate 12. On the inorganic oxide film 31, more alcohol having a larger molecular weight (larger number of carbon atoms) is chemically bonded rather than the inorganic oxide film 41. Therefore, it is possible to improve the performance of the liquid crystal panel 1.

Generally, in order to prevent the burn-in phenomenon of the liquid crystal panel 1, when the force of aligning the liquid crystal molecules is too strong, a tendency of buring phenomenon may be increased. Therefore, it is preferable to make the molecular attraction between the liquid crystal molecules and the alignment film weak and select alcohol which has a comparatively small molecular weight as the alcohol which is chemically bonded to the inorganic oxide film 31 (41).

In the meantime, in order to prevent the abnormal alignment of the liquid crystal panel 1, due to the reaction between the hydroxyl group and the liquid crystal molecules existing on the inorganic oxide film 31 (41) (to improve light resistance and durability), it is preferable to keep the liquid crystal molecules as far away from the hydroxyl group which remains on the inorganic oxide film 31 (41) as possible. It is further preferable to select alcohols having a comparatively larger molecular weight (comparatively larger number of carbon atoms) as the alcohol which is chemically bonded to the inorganic oxide film 31 (41).

However, since the TFT substrate 17 has TFTs 173, the TFT substrate easily attains higher temperature than the temperature of the counter substrate 12, and the activity of the hydroxyl group which remains on the inorganic oxide film 31 increases by heating. Therefore, at the interface of the alignment film 3 and the liquid crystal layer 2, the liquid crystal molecules react with the active hydroxyl group to become a state which may be easily modified and deteriorated. Consequently, in the alignment film 3 close to the TFT substrate 17, it is effective to reliably prevent the liquid crystal molecules from being contact with the inorganic oxide film 31 by chemically bonding the alcohol having higher molecular weight.

In contrast, as for the alignment film 4 close to the counter substrate 12, since the main aim is to prevent the burn-in phenomenon, the alcohol having the small molecular weight is selected.

It is preferable that the molecular weights of the alcohols of the alignment films 3 and 4 are different from each other. As the alcohols, an alcohol having a high molecular weight and an alcohol having a low molecular weight may be appropriately mixed.

Especially, in the alignment film 3 which uses the alcohol having a high molecular weight, when the alcohol having a low molecular weight is combined thereto, it is possible to chemically bond the alcohol to both the hydroxyl group between the alcohols having a high molecular weight and the hydroxyl group which exists at the rear side of the micropores 30. Therefore, it is possible to reliably reduce the amount of the hydroxyl group which remains on the inorganic oxide film 31.

As mentioned above, in the present embodiment, in order to make the average molecular weight of the alcohol of the alignment film 3 close to the TFT substrate 17 larger than that of the alcohol of the alignment film 4 close to the counter substrate 12, an alcohol which is used for treating the inorganic oxide film 31 and 41.

When the molecular weight has the relationship of alcohol X>alcohol Y>alcohol Z, in order to make the combination that the average molecular weight of the alcohol of the alignment film 3 close to the TFT substrate 17 is larger than the average molecular weight of the alcohol of the alignment film 4 close to the counter substrate 12 for liquid crystal panel, the following combinations are mentioned.

I: alignment film 3: X, alignment film 4: Y or z

II: alignment film 3: X+Y, alignment film 4: X+Y (wherein, X/Y: alignment film 3>alignment film 4)

III: alignment film 3: X+Y, alignment film 4: Y+Z

IV: alignment film 3: X, alignment film 4: X+Z

When any one of the alcohol of the alignment film 3 and the alcohol of the alignment film 4 has a plurality types of alcohols, the other has one type of alcohol, it is preferable that the alcohol of the one of the alignment films has the same type of alcohol as the other alignment film (refer to IV).

Further, when both the alcohol of the alignment film 3 and the alcohol of the alignment film 4 have a plurality of types of alcohols, the other has one type of alcohol, it is preferable that the alcohol of the alignment film 3 and the alcohol of the alignment film 4 have the same type (refer to III).

As mentioned above, since the alcohol of the alignment film 3 and the alcohol of the alignment film 4 contain the same type alcohol, in the case of adjusting the vertical anchoring force with respect to the liquid crystal molecules, it is possible to prevent a great difference between the vertical anchoring forces in the alignment films 3 and 4. In other word, it is possible to easily adjust the vertical anchoring force with respect to the liquid crystal molecules.

The average molecular weight of the alignment film 3 is preferably about 100 to 400, more preferably about 120 to 400. Accordingly, it is possible to reliably extend the time required for abnormal alignment, that is, to reliably improve the durability (light resistance).

It is preferable to mainly select alcohols having 6 to 30 carbon atoms (especially, 8 to 30 carbon atoms) as the alcohol of the alignment film 3. As a result, the above mentioned effect may be remarkable.

Further, an alcohol having such carbon atoms is in a liquid phase at ambient temperature, and even when the alcohol is in a semisolid phase (a solid phase), it can be transformed to a liquid phase at a comparatively low temperature. Therefore, the alcohol is conveniently used in treating an inorganic oxide film 31 (41) with a treatment solution as described below. Moreover, since the alcohol has stronger affinity to liquid crystal molecules, it is possible to increase the vertical anchoring force with respect to liquid crystal molecules.

Examples of the alcohol include an aliphatic alcohol, an aromatic alcohol, an alicyclic alcohol, a heterocyclic alcohol, a polyhydric alcohol or a halogen-substituted body thereof (especially, a fluorine-substituted body). Among these, an aliphatic alcohol, an alicyclic alcohol or a fluorine-substituted body thereof (fluoroalcohol) are preferred. By using an aliphatic alcohol, an alicyclic alcohol or a fluorine-substituted body thereof, the vertical anchoring force with respect to liquid crystal molecules is further increased, and the liquid crystal molecules can be homeotropically aligned more assuredly.

Moreover, an aliphatic alcohol or a fluorine-substituted body thereof having a steroid skeleton is more preferred. In order to have a structure with high planarity, the aliphatic alcohol or a fluorine-substituted body thereof having a steroid skeleton is particularly excellent in functions to control alignment of the liquid crystal molecules.

Among these, as alcohols of the alignment film 3, mainly aliphatic alcohols such as octanol, nonanol, decanol, undecanol, dodecanol, tridecanol, tetradecanol, pentadecanol, hexadecanol, heptadecanol, octadecanol, eicosanol, heneicosanol, docosanol, tricosanol and tetracosanol, alicyclic alcohols such as cholesterol, epicholesterol, cholestanol, epicholestanol, ergostanol, epiergostanol, coprastanol, epicoprastanol, α-ergosterol, β-sitosterol, stigmasterol and campesterol or a fluorine-substituted body thereof are preferred.

Further, aliphatic alcohol or a fluorine-substituted body thereof may have its hydrocarbon portion or fluorinated carbon portion (main skeleton portion) in any form of straight chain or branched.

Meanwhile, the average molecular weight of alcohols in an alignment film 4 is preferably about 32 to 70, and more preferably about 32 to 60. Therefore, it is possible to prevent burn-in phenomenon of a liquid crystal panel 1, more assuredly.

Moreover, alcohols of an alignment film 4 having 1 to 4 carbon atoms (particularly, 1 to 3 carbon atoms) as a main component is preferred. Therefore, the effects may be remarkable.

Further, the first alcohol having such carbon atoms is small in the molecular size, thus it is possible in that the alcohol molecules are assuredly penetrated into the rear side of micropores 40. In addition, since the alcohol is in a liquid phase at ambient temperature, it is convenient in treating an inorganic oxide film 31 (41) with a treatment solution described below.

Examples of such alcohols include an aliphatic alcohol, a polyhydric alcohol or a halogen-substituted body thereof (particularly, a fluorine-substituted body), and among these, an aliphatic alcohol or a fluorine-substituted body thereof (fluoroalcohol) are preferred.

Therefore, as alcohols of an alignment film 4, mainly methanol, ethanol, propanol or a fluorine-substituted body thereof are preferred.

In addition, since there are many fluorinated liquid crystal molecules, by using a fluorine-substituted body, the liquid molecules have increased affinity, and the effect of homeotropically aligning the liquid molecules is further increased.

In the present embodiment, the case of having larger average molecular weight of alcohol of the alignment film 3 close to the TFT substrate (first substrate) 17, which attains high temperature than the average molecular weight of the alcohol of the alignment film 4 close to the counter substrate 12 (second substrate) is described. However, in the case of the liquid crystal molecules in a constitution where the second substrate attains higher temperature than the first substrate, it is preferably designed such that the average molecular weight of the alcohol of an alignment film in the second substrate is larger than the average molecular weight of an alignment film in the first substrate.

Further, the invention has an object of preventing the electrical variation in the pair of alignment films in addition to the object of preventing the abnormal alignment and the burn-in phenomenon.

For example, the liquid crystal panel 1 may be fabricated through the following procedure:

[1] First, the TFT substrate 17 and the counter substrate 12 are prepared using the known method.

[2] Next, the alignment film 3 is formed on the TFT substrate 17 and the alignment film 4 is formed on the transparent conductive film 14 of the counter substrate 12 so as to cover the pixel electrodes 172 and the TFTs 173.

Since methods (processes) of forming the alignment films 3 and 4 are the same as each other, the method of forming the alignment film 3 will be described as an example.

Figure 3:
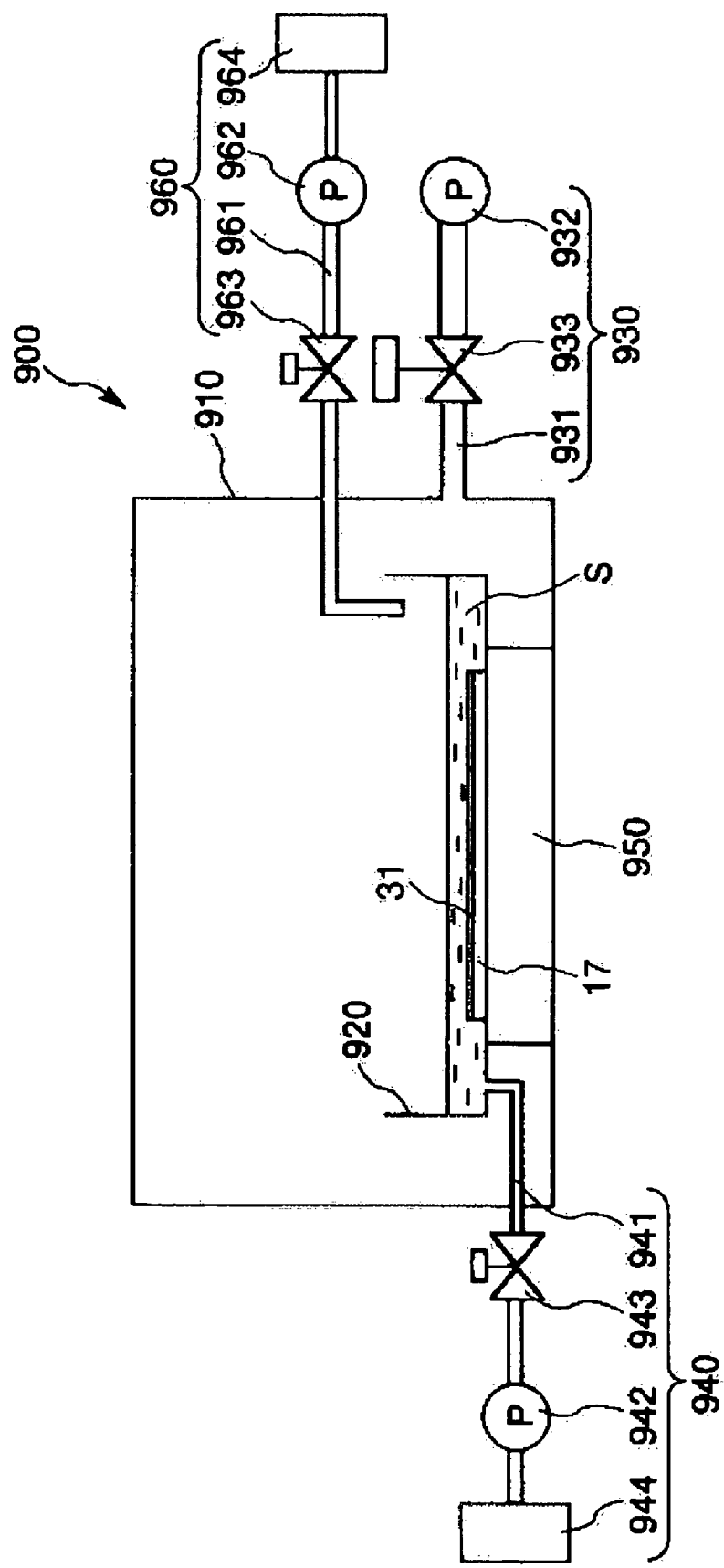
FIG. 3 is a view showing a construction of a treatment device used for a method of manufacturing an electronic device according to the embodiment of the invention.

Furthermore, in the processes [22] to [24], for example, a treatment device 900 shown in FIG. 3 is used.

The treatment device 900 shown in FIG. 3 includes a chamber 910, a stage 950 provided in the chamber 910, a container 920 provided on the stage 950, a solution supplying unit 960 for supplying a treatment solution S into the container 920, a draining unit 940 for draining the treatment solution S from the container 920, and a degassing unit 930 for degassing the chamber 910.

Additionally, a heating unit (not shown), for example, a heater is provided in the stage 950.

The degassing unit 930 includes a pump 932, a degassing line 931 through which the pump 932 communicates with the chamber 910, and a valve 933 provided on a predetermined location of the degassing line 931.

Furthermore, the draining unit 940 includes a recovery tank 944 for recovering the treatment solution S, a draining line 941 through which the recovery tank 944 communicates with the container 920, and a pump 942 and a valve 943 provided on a predetermined location of the draining line 941.

Additionally, the solution supplying unit 960 includes a storage tank 964 for storing the treatment solution S therein, a solution supplying line 961 through which the treatment solution S is provided from the storage tank 964 into the container 920, and a pump 962 and a valve 963 provided on a predetermined location of the solution supplying line 961.

In addition, heating units (for example, a heater, etc.), which are not shown, are each provided in the draining unit 940 and the solution supplying unit 960 to heat the treatment solution S.

[21] First, an inorganic oxide film 31 is formed on the TFT substrate 17 using an oblique deposition method. An inorganic oxide film 31 having a plurality of micropores 30 is obtained by the oblique deposition method.

In this connection, an angle at which inorganic oxides vaporized from a deposition source meet an upper surface of the TFT substrate 17 is appropriately adjusted to control an angle at which the micropores 30 cross the upper surface of the TFT substrate 17.

Additionally, it is preferable that the TFT substrate 17 be separated from the deposition source if possible. When the TFT substrate 17 is sufficiently separated from the deposition source, the inorganic oxides vaporized from the deposition source reach the surface of the TFT substrate 17 in an almost constant direction. Thereby, the inorganic oxide film 31 having higher alignment is formed.

[22] Next, the TFT substrate 17 on which the inorganic oxide film 31 is formed is immersed in the treatment solution S containing alcohol as described above.

Concretely, the chamber 910 is opened, and the TFT substrate on which the inorganic oxide film 31 is formed is filled into the container 920.

Next, the chamber 910 is sealed, the pump 962 is operated, and, at this time, the valve 963 is opened to supply the treatment solution S from the storage tank 964 through the solution supplying line 961 into the container 920.

Once the treatment solution S is supplied into the container 920 in a predetermined amount, that is, the amount in which the TFT substrate 17 is completely immersed, the valve 963 is closed while the pump 962 is stopped.

In this connection, alcohol may be present in a liquid phase at room temperature, or in a solid or semisolid state at room temperature.

If alcohol present in the liquid state at room temperature is used, alcohol itself (the alcohol content is about 100%) or alcohol mixed with an appropriate solvent may be used as the treatment solution S.

Furthermore, in case alcohol present in the solid or semisolid phase at room temperature is used, alcohol, which is liquefied by heating, or alcohol dissolved in an appropriate solvent may be used as the treatment solution S.

If alcohol is mixed with or dissolved in the solvent, the solvent, which is capable of being mixed with alcohol or dissolved in alcohol and has the polarity that is lower than that of alcohol, is selected. Thereby, the solvent is prevented from obstructing the reaction between a hydroxyl group of the inorganic oxide film 31 and alcohol in a post-process [24], thus it is possible to ensure occurrence of the chemical reaction.

[23] Next, the pressure in the chamber 910 (a space into which the treatment solution S is loaded) is reduced to cause the treatment solution S to permeate into the micropores 30 of the inorganic oxide film 31.

Concretely, the chamber 910 is sealed, the pump 932 is operated, and, at this time, the valve 933 is opened to discharge the gas from the chamber 910 through the degassing line 931 to the outside of the treatment device 900.

The pressure in the chamber 910 is slowly reduced to remove gas (for example, air, etc.) from the treatment solution S and the micropores 30 of the inorganic oxide film 31 and to cause the treatment solution S to permeate into the micropores 30.

Additionally, if the pressure in the chamber 910 reaches a predetermined value, the pump 932 is stopped and the valve 933 is closed at the same time.

The pressure in the chamber 910 (space), that is, a vacuum of the chamber 910 is preferably about $10^{-4}$ to $10^4$ Pa, more preferably about $10^{-2}$ to $10^3$ Pa. Thereby, air is desirably removed from the micropores 30 of the inorganic oxide film 31 and the treatment solution S desirably permeates into the micropores 30.

Next, the pump 942 is operated, and, at this time, the valve 943 is opened to provide the surplus treatment solution S from the container 920 through the draining line 941 into the recovery tank 944.

Once almost all the treatment solution S is recovered from the container 920, the pump 942 is stopped and the valve 943 is closed at the same time.

[24] Next, alcohol is chemically bonded to a surface and inner surface of the micropores 30 of the inorganic oxide film 31.

Concretely, the heating unit provided in the stage 950 is operated to heat the TFT substrate 17 on which the inorganic oxide film 31 is formed.

Thereby, a dehydrating condensation reaction occurs between the hydroxyl group present on the surface and in the micropores 30 of the inorganic oxide film 31 and the hydroxyl group contained in alcohol, and alcohol is chemically bonded to the surface and the inner surface of the micropores 30 of the inorganic oxide film 31.

As a result, a coated film 32 consisting mostly of a main skeleton portion of alcohol is formed along the surface and the inner surface of the micropores 30 of the inorganic oxide film 31, and the alignment film 3 is obtained.

Furthermore, before the heating is conducted, the pressure in the chamber 910 may be reduced if necessary.

The heating temperature of the TFT substrate 17 is not limited, but is preferably about 80 to 250° C., more preferably about 100 to 200° C. If the heating temperature is too low, alcohol may be undesirably chemically bonded to the inorganic oxide film 31 according to the type of alcohol or the type of inorganic oxides. On the other hand, even though the heating temperature is higher than the above-mentioned upper limit value, it is difficult to expect an additional improvement in effect.

Furthermore, the heating time of the TFT substrate 17 is not limited, but is preferably about 20 to 180 minutes, more preferably about 40 to 100 minutes. If the heating time is too short, alcohol may be undesirably chemically bonded to the inorganic oxide film 31 according to other conditions including the heating temperature. On the other hand, even though the heating temperature is higher than the above-mentioned upper limit value, it is difficult to expect an additional improvement in effect.

A heating process may be used to react the hydroxyl group present on the surface and in the micropores 30 of the inorganic oxide film 31 and alcohol with each other as described above, thereby the reaction is easily and surely conducted.

Furthermore, the reaction is not limited depending on the type of heating process, and, for example, the reaction may be conducted using radiation of ultraviolet rays or infrared rays. In this case, an apparatus (unit) required to conduct each treatment is provided in the treatment device 900.

Additionally, in case a plurality of alcohols is used, a plurality of alcohols may be simultaneously mixed in the treatment solution S. In this case, a ratio of alcohols chemically bonded to the inorganic oxide film 31 may be controlled by appropriately adjusting, for example, a mixing ratio, types, molecular weights, and treating conditions of alcohols in the treatment solution S.

Additionally, a plurality of treatment solutions containing alcohols is prepared, and the TFT substrate 17 may be treated sequentially using the treatment solutions as described above. In this case, the TFT substrate 17 is preferably treated using the treatment solutions in such a way that the treatment solution including alcohol having the smallest molecular weight is first used and the treatment solution including alcohol having the larger molecular weight is then used. Thereby, it is possible to more surely chemically bond alcohol having the low molecular weight to the inner surface of the micropores 30.

Furthermore, if it is required that alcohol is selectively chemically bonded to the surface of the inorganic oxide film 31, it is desirable that the treatment solution S just comes into contact with the surface of the inorganic oxide film 31. Thereby, use of the above-mentioned treatment device 900 may be omitted, thus it is possible to simplify a process of fabricating the liquid crystal panel 1 or reduce the fabrication cost.

Examples of a method of bringing the treatment solution S into contact with the inorganic oxide film 31 may include a method of applying the treatment solution S on the inorganic oxide film 31 (application method), a method of immersing the TFT substrate 17 on which the inorganic oxide film 31 is formed into the treatment solution S (immersion method), a method of exposing the inorganic oxide film 31 to the vapor of the treatment solution S, or a combination thereof.

Furthermore, examples of the application method may include a spin coating method, a casting method, a micro gravure coating method, a gravure coating method, a bar coating method, a roll coating method, a wire bar coating method, a dip coating method, a spray coating method, a screen printing method, a flexo printing method, an offset method, and an inkjet printing method.

[3] Next, the alignment films 3 and 4 face each other, the TFT substrate 17 is bonded to the counter substrate 12 using a sealing material (not shown), the liquid crystal (the liquid crystal composition) is injected through a closing hole (not shown) of a pore portion, which is formed by the bonding, into the pore portion, and the closing hole is blocked (closed).

In the liquid crystal panel 1, the TFT substrate is used as a substrate for operating the liquid crystal. However, in addition to the TFT substrate, other substrates, for example, a TFD substrate and a STN substrate may be used as the substrate for operating the liquid crystal.

Next, as an example of an electronic apparatus according to the invention, an electronic apparatus (a liquid crystal projector) using the above-mentioned liquid crystal panel 1 will be described.

Figure 4:
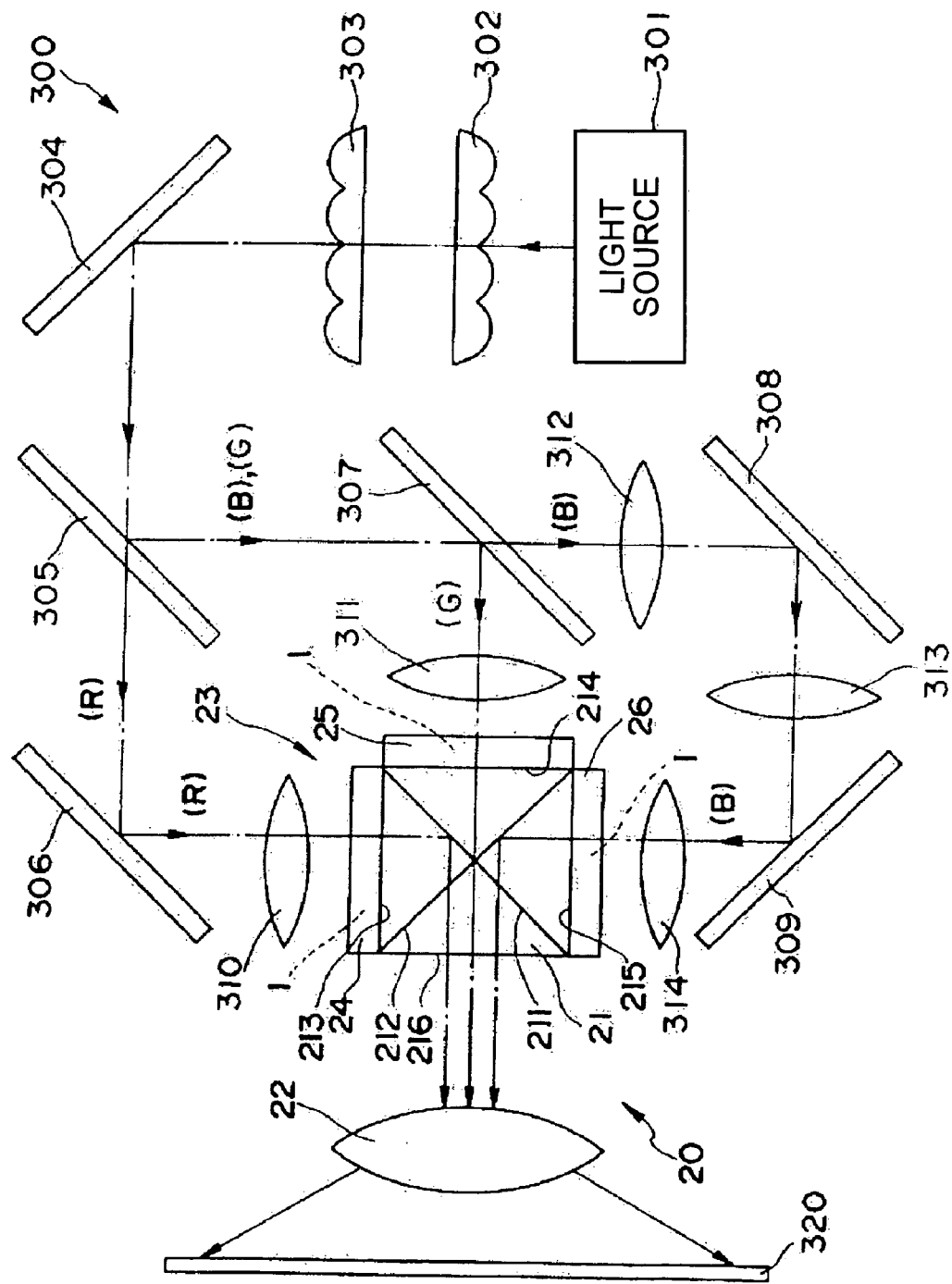
FIG. 4 is a view an optical system of a projection type display device into which an electronic apparatus according to the embodiment of the invention is applied.

FIG. 4 is a view schematically showing an optical system of an electronic apparatus (a projection display device) according to the invention.

As shown in FIG. 4, a projection display device 300 includes a light source 301, an irradiating optical system provided with a plurality of integrator lenses, a color separating optical system (a light guiding optical system) provided with a plurality of dichroic mirrors and so on, a (red) liquid crystal light valve (a liquid crystal light shutter array) 24 corresponding to red, a (green) liquid crystal light valve (a liquid crystal light shutter array) 25 corresponding to green, a (blue) liquid crystal light valve (a liquid crystal light shutter array) 26 corresponding to blue, a dichroic prism (a color synthesizing optical system) 21 on which a dichroic mirror surface 211 reflecting only red light component and a dichroic mirror surface 212 reflecting only blue light component, and a projective lens (a projective optical system) 22.

Further, the irradiating optical system has integrator lenses 302 and 303. The color separating optical system has mirrors 304, 306 and 309, a dichroic mirror 305 for reflecting blue light component and green light component (transmitting only red light component), a dichroic mirror 307 for reflecting only the green light component, a dichroic mirror 308 for reflecting only the blue light component (or a mirror reflecting the blue light component), and condensing lenses 310, 311, 312, 313 and 314.

The liquid crystal light valve 25 is provided with the above-mentioned liquid crystal panel 1. The liquid crystal light valves 24 and 26 have the same construction as the liquid crystal light valve 25. The liquid crystal panels 1 included in the respective liquid crystal light valves 24, 25 and 26 are respectively connected to driving circuits which are not shown.

Moreover, in the projection display device 300, an optical block 20 is configured by the dichroic prism 21 and the projective lens 22. Further, a display unit 23 is configured by the optical block 20, and the liquid crystal light valves 24, 25 and 26 fixedly arranged to the dichroic prism 21.

Hereinafter, an action of the projection display device 300 will be described.

A white light component (a white light flux) emitted from the light source 301 transmits the integrator lenses 302 and 303. An optical intensity of the white light component (a brightness distribution) is equalized by the integrator lenses 302 and 303. The white light emitted from the light source 301 preferably has a relatively high optical intensity. Thus, it is possible to make an image to be formed on a screen 320 more bright. Further, since the liquid crystal panel 1 having excellent light resistance is used in the projection display device 300, it is possible to maintain stability for a long time even when the light emitted from the light source 301 has a high intensity.

The white light components transmitted the integrator lenses 302 and 303 are reflected to a left side of FIG. 4 in the mirror 304. Among the reflected light components, the blue light component (B) and the green light component (G) are respectively reflected to a lower side of FIG. 4 in the dichroic mirror 305, and the red light component (R) transmits the dichroic mirror 305.

The red light component transmitted the dichroic mirror 305 is reflected to a lower side of FIG. 4 in the mirror 306, and the reflected light is shaped by the condensing lens 310 and incident to the red liquid crystal light valve 24.

Between the blue light component and the green light component reflected in the dichroic mirror 305, the green light component is reflected to a left side of FIG. 4 in the dichroic mirror 307, and the blue light component transmits the dichroic mirror 307.

The green light component reflected in the dichroic mirror 307 is shaped by the condensing lens 311 and incident to the green liquid crystal light valve 25.

Further, the blue light component transmitted the dichroic mirror 307 is reflected to a left side of FIG. 4 in the dichroic mirror (or mirror) 308, and then the reflected light is reflected to an upper side of FIG. 4 in the mirror 309. The blue light component is shaped by the condensing lenses 312, 313 and 314 and incident to the blue liquid crystal light valve 26.

As described above, the white light component emitted from the light source 301 is separated into three primary colors of red, green and blue by the color separating optical system, and the respective separated light components are guided and incident to the corresponding liquid crystal light valve.

At this time, the respective pixels (the thin film transistors 173 and the pixel electrodes 172 connected thereto) of the liquid crystal panel 1 included in the liquid crystal light valve 24 are switchably controlled (on/off) by the driving circuit (driving means) which operates based on the red image signal, that is, modulated.

Similarly, the green light component and the blue light component are respectively incident to the liquid crystal light valves 25 and 26, and modulated in the respective liquid crystal panels 1, such that the green image and the blue image are respectively formed. At this time, the respective pixels of the liquid crystal panel 1 included in the liquid crystal light valve 25 are switchably controlled by the driving circuit which operates based on the green image signal, and the respective pixels of the liquid crystal panel 1 included in the liquid crystal light valve 26 are switchably controlled by the driving circuit which operates based on the blue image signal.

Thus, the red light component, the green light component and the blue light component are respectively modulated in the liquid crystal light valves 24, 25 and 26, such that the red image, the green image and the blue image are respectively formed.

The red image formed by the above-mentioned liquid crystal light valve 24, that is, the red light component from the light crystal light valve 24 is incident to the dichroic prism 21 from a surface 213, is reflected to a left side of FIG. 4 in the dichroic mirror surface 211, transmits the dichroic mirror surface 212, and is emitted from the emitting surface 216.

Further, the green image formed by the above-mentioned liquid crystal light valve 25, that is, the green light component from the liquid crystal light valve 25 is incident to the dichroic prism 21 from a surface 214, transmits the dichroic mirror surfaces 211 and 212 respectively, and is emitted from the emitting surface 216.

Further, the blue image formed by the above-mentioned liquid crystal light valve 26, that is, the blue light component from the liquid crystal light valve 26 is incident to the dichroic prism 21 from a surface 215, is reflected to a left side of FIG. 4 in the dichroic mirror surface 212, transmits the dichroic mirror surface 211, and is emitted from the emitting surface 216.

As described above, the respective color light components from the above-mentioned liquid crystal light valves 24, 25 and 26, that is, the respective images formed by the liquid crystal light valves 24, 25 and 26 are synthesized by the dichroic prism 21, such that a color image is formed. The image is projected (magnified and projected) on the screen 320 arranged at a predetermined position by the projective lens 22.

The projection display device 300 according to the present embodiment having three liquid crystal planes to which the liquid crystal panel 1 is applied is described. However, at least one of the three liquid crystal panels may be the liquid crystal panel 1. In this case, it is preferable to apply the liquid crystal panel 1 to a blue liquid crystal light valve.

Moreover, an electronic apparatus according to the present invention may include electronic apparatuses other than the projection display device of FIG. 4. For example, a personal computer (mobile personal computer), a cellular phone (including PHS), a digital still camera, a television, a video camera, a view finder type or monitor-direct-view type video tape recorder, a car navigation device, a pager, an electronic organizer (including one with a communication function), an electronic dictionary, an electronic calculator, an electronic game machine, a word processor, a workstation, a video phone, a television monitor for security, electronic binoculars, a POS terminal, an apparatus with a touch panel (for example, cash dispenser of a financial organization, an automated ticket vending machine), a medical apparatus (for example, an electronic thermometer, a sphygmomanometer, a blood sugar meter, an electrocardiogram display device, an ultrasonic diagnosis apparatus, an endoscopic display device), a fish finder, various measurement instruments, meters (for example, meters of a vehicle, an aircraft or a container), a flight simulator may be included. It is needless to say that the above-mentioned liquid crystal panel according to the present invention can be applied as a display unit or a monitor unit of these electronic apparatuses.

As described above, even though the liquid crystal panel and the electronic apparatus of the invention is described with reference to the embodiment shown in drawings, the invention is not limited thereto.

For example, in the liquid crystal panel and the electronic apparatus of the invention, the construction of the individual components may be modified to another one and other components may be added thereto as they may have the same function.

EXAMPLES

Next, specific Examples of the invention will be described.

1. Production of TFT Substrate having Alignment Film Adhered

Hereinbelow, 10 of TFT substrates having an alignment film adhered, with respective sample Nos., were produced.

Sample No. 11

<1A> First, a TFT substrate as shown in FIG. 1 was prepared, and the surface of the substrate was set in a vacuum deposition apparatus such that the surface was 50° to the deposition source.

Then, the pressure in the deposition apparatus was reduced ($10^{-4}$ Pa), and $SiO_2$ was oblique deposited, thereby a TFT substrate having an oblique-deposited film (inorganic oxide film) adhered was produced.

Further, the angle between micropores of the resulting oblique-deposited film and the upper surface of the TFT substrate was about 70°.

<2A> Next, the TFT substrate having an oblique-deposited film adhered was heated at 200° C. for 90 minutes in a clean oven, and immediately after completion of heating, the substrate was transferred into dried nitrogen atmosphere where it was left to stand as it was.

<3A> Next, a mixed solution (weight ratio=95:5) of 1-octanol (molecular weight: 130) and 2-propanol (molecular weight: 60) was prepared, ionic impurities were removed using a filter for filtration, and then a trace amount of moisture was removed by nitrogen bubbling, thereby adjusted a treatment solution.

<4A> Next, the TFT substrate having an oblique-deposited film adhered was introduced to a treatment apparatus as shown in FIG. 3, where the substrate was installed in a container (made of polytetrafluoroethylene) having the oblique-deposited film upward.

Then, after sealing the chamber, the prepared treatment solution was provided into the container, and the TFT substrate having an oblique-deposited film adhered was immersed in the treatment solution.

<5A> Next, in the conditions of the above process <4A>, the pressure in the chamber was reduced to 100 Pa. Thereby, the gas in the micropores of the oblique-deposited film was substituted with the treatment solution. That is, the treatment solution was penetrated into the micropores.

<6A> Next, after discharging the excess of treatment solution from the container, again, the pressure in the chamber was reduced to 133 Pa (1 Torr), and the substrate was heated at 150° C. for 1 hour.

Thereby, 1-octanol and 2-propanol was chemically bonded to the surface of the oblique-deposited film and inner surface of the micropores.

<7A> After completion of heating, while maintaining the reduced pressure condition, the substrate was left to cool.

Further, the resulting alignment film had the average film thickness of 45 nm.

Three among the produced TFT substrates having an alignment film adhered were heated respectively at 200° C., and the gas generated therefrom was analyzed with GC-MS ("GC-MS QP5050A", manufactured by Shimadzu Corporation).

Then, from the obtained GC-MS chart, the amount of propylene and octene generated was measured by time integrating the surface area of the peaks belonging to propylene and octene.

The result was propylene:octene=90:10.

Further, the amount of propylene and octene generated was proportional to the amount of 2-propanol and 1-octanol chemically bonded to the oblique-deposited film.

Therefore, the average molecular weight of alcohols chemically bonded to the inorganic oxide film was 123.

Sample No. 12

1-Octanol was prepared, ionic impurities were removed using a filter for filtration, and then a trace amount of moisture was removed by nitrogen bubbling, thereby adjusted a treatment solution. Except for using the treatment solution, a TFT substrate having an alignment film adhered was produced in the same manner as in the Sample No. 11.

Sample No. 13

2-Propanol was prepared, ionic impurities were removed using a filter for filtration, and then a trace amount of moisture was removed by nitrogen bubbling, thereby adjusted a treatment solution. Except for using the treatment solution, a TFT substrate having an alignment film adhered was produced in the same manner as in the Sample No. 11.

Sample No. 14

Except for forming an alignment film by oblique depositing $Al_2O_3$ instead of $SiO_2$, a TFT substrate having an alignment film adhered was produced in the same manner as in the Sample No. 11.

The result of GC-MS analysis was propylene:octene=93:7.

Therefore, the average molecular weight of alcohols chemically bonded to the inorganic oxide film was 125.

Sample No. 15

Except for forming an alignment film by oblique depositing $Al_2O_3$ instead of $SiO_2$, a TFT substrate having an alignment film adhered was produced in the same manner as in the Sample No. 12.

Sample No. 16

Except for forming an alignment film by oblique depositing $Al_2O_3$ instead of $SiO_2$, a TFT substrate having an alignment film adhered was produced in the same manner as in the Sample No. 13.

2. Production of Counter Substrate for Liquid Crystal Panel having Alignment Film Adhered Hereinbelow, 10 of counter substrates for liquid crystal panel having an alignment film adhered, with respective sample Nos. were produced.

Sample No. 21

<1B> First, a counter substrate as shown in FIG. 1 was prepared, and the surface of the substrate was set in a vacuum deposition apparatus such that the surface was 50° to the deposition source.

Then, the pressure in the deposition apparatus was reduced ($10^{-4}$ Pa), and $SiO_2$ was oblique deposited, thereby a counter substrate having an oblique-deposited film (inorganic oxide film) adhered was produced.

Further, the angle between micropores of the resulting oblique-deposited film and the upper surface of the counter substrate was about 70°.

<2B> Next, the counter substrate having an oblique-deposited film adhered was heated at 200° C. for 90 minutes in a clean oven, and immediately after completion of heating, the substrate was transferred into dried nitrogen atmosphere where it was left to stand as it was.

<3B> Next, 2-propanol was prepared, ionic impurities were removed using a filter for filtration, and then a trace amount of moisture was removed by nitrogen bubbling, thereby adjusted a treatment solution.

<4B> Next, the counter substrate having an oblique-deposited film adhered was introduced to a treatment apparatus as shown in FIG. 3, where the substrate was installed in a container (made of polytetrafluoroethylene) having the oblique-deposited film upward.

Then, after sealing the chamber, the prepared treatment solution was provided into the container, and the counter substrate having an oblique-deposited film adhered was immersed in the treatment solution.

<5B> Next, in the conditions of the above process <4B>, the pressure in the chamber was reduced to 100 Pa.

Thereby, the gas in the micropores of the oblique-deposited film was substituted with the treatment solution. That is, the treatment solution was penetrated into the micropores.

<6B> Next, after discharging the excess of treatment solution from the container, again, the pressure in the chamber was reduced to 133 Pa (1 Torr), and the substrate was heated at 150° C. for 1 hour.

Thereby, 2-propanol was chemically bonded to the surface of the oblique-deposited film and inner surface of the micropores.

<7B> After completion of heating, while maintaining the reduced pressure condition, the substrate was left to cool.

Further, the resulting alignment film had the average film thickness of 43 nm.

Sample No. 22

1-Octanol was prepared, ionic impurities were removed using a filter for filtration, and then a trace amount of moisture was removed by nitrogen bubbling, thereby adjusted a treatment solution. Except for using the treatment solution, a counter substrate having an alignment film adhered was produced in the same manner as in the Sample No. 21.

Sample No. 23

A mixed solution (weight ratio=75:25) of 2-propanol (molecular weight: 60) and ethanol (molecular weight: 46) was prepared, ionic impurities were removed using a filter for filtration, and then a trace amount of moisture was removed by nitrogen bubbling, thereby adjusted a treatment solution.

The result of GC-MS analysis was propylene:ethylene=75: 25.

Therefore, the average molecular weight of alcohols chemically bonded to the inorganic oxide film was 57.

Sample No. 24

Except for forming an alignment film by oblique depositing $Al_2O_3$ instead of $SiO_2$, a counter substrate having an alignment film adhered was produced in the same manner as in the Sample No. 21.

Sample No. 25

Except for forming an alignment film by oblique depositing $Al_2O_3$ instead of $SiO_2$, a counter substrate having an alignment film adhered was produced in the same manner as in the Sample No. 22.

Sample No. 26

Except for forming an alignment film by oblique depositing $Al_2O_3$ instead of $SiO_2$, a counter substrate having an alignment film adhered was produced in the same manner as in the Sample No. 23.

The result of GC-MS analysis was propylene: ethylene=70:30.

Therefore, the average molecular weight of alcohols chemically bonded to the inorganic oxide film was 56.

3. Preparation of Liquid Crystal Panel

Hereinbelow, liquid crystal panels of each Example and each Comparative Example were prepared, respectively.

Example 1A

First, with respect to the TFT substrate having an alignment film adhered of Sample No. 11, a thermosetting adhesive ("ML3804P", manufactured by Nippon Kayaku Co., Ltd.) was printed along the outer periphery of the surface, where the alignment film was formed, excluding the portion to become a liquid crystal injection opening, and heated at 80° C. for 10 minutes to remove solvents.

In addition, a thermosetting adhesive is epoxy resins mixed with silica spheres having about 3 μm in diameter.

Next, by having the surface, where the alignment film of the counter substrate having an alignment film adhered of Sample No. 21 was formed, to the inner side, two sheets of the substrate were adhered by heating at 140° C. for 1 hour while compressing.

Further, the two sheets of the substrate were arranged such that the alignment of the alignment film was 180° to each other.

Next, to the space of the inner side, where two sheets of substrate were adhesively formed, a fluorine-based negative dielectric anisotropy liquid crystal ("MLC-6610", manufactured by Merk & Co., Inc.) was injected from the liquid crystal injection opening by the vacuum injection method.

Next, the liquid crystal injection opening was cured using an acryl-based UV adhesive ("LPD-204", manufactured by Henkel Japan, Ltd.) and irradiating 3000 mJ/$cm^2$ of UV at the wavelength of 365 nm, and thus sealed the liquid crystal injection opening.

In accordance with the above, the crystal panel was prepared.

Example 2A

Except for using the TFT substrate having an alignment film adhered of Sample No. 12 and the counter substrate having an alignment film adhered of Sample No. 21, a liquid crystal panel was prepared in the same manner as in Example 1A.

Example 3A

Except for using the TFT substrate having an alignment film adhered of Sample No. 11 and the counter substrate having an alignment film adhered of Sample No. 23, a liquid crystal panel was prepared in the same manner as in Example 1A.

Comparative Example 1A

Except for using the TFT substrate having an alignment film adhered of Sample No. 13 and the counter substrate having an alignment film adhered of Sample No. 21, a liquid crystal panel was prepared in the same manner as in Example 1A.

Comparative Example 2A

Except for using the TFT substrate having an alignment film adhered of Sample No. 12 and the counter substrate having an alignment film adhered of Sample No. 22, a liquid crystal panel was prepared in the same manner as in Example 1A.

Example 1B

Except for using the TFT substrate having an alignment film adhered of Sample No. 14 and the counter substrate having an alignment film adhered of Sample No. 24, a liquid crystal panel was prepared in the same manner as in Example 1A.

Example 2B

Except for using the TFT substrate having an alignment film adhered of Sample No. 15 and the counter substrate having an alignment film adhered of Sample No. 24, a liquid crystal panel was prepared in the same manner as in Example 1A.

Example 3B

Except for using the TFT substrate having an alignment film adhered of Sample No. 14 and the counter substrate having an alignment film adhered of Sample No. 26, a liquid crystal panel was prepared in the same manner as in Example 1A.

Comparative Example 1B

Except for using the TFT substrate having an alignment film adhered of Sample No. 16 and the counter substrate having an alignment film adhered of Sample No. 24, a liquid crystal panel was prepared in the same manner as in Example 1A.

Comparative Example 2B

Except for using the TFT substrate having an alignment film adhered of Sample No. 15 and the counter substrate having an alignment film adhered of Sample No. 25, a liquid crystal panel was prepared in the same manner as in Example 1A.

4. Tests on Light Resistance and Observation of Burn-In of Liquid Crystal Panel

As for the test on light resistance, the liquid crystal panels produced in each Example and comparative Example were set respectively as a liquid crystal light valve for blue color in a projection display device as shown in FIG. 4. While maintaining the surface temperature of liquid crystal panel at 55° C., the light source was continuously lighted, and the time until the display defect is generated was measured.

In addition, 130 WUHP lamp (manufactured by Philips) was used for a light source.

As for the observation test on burn-in, the liquid crystal panels produced in each Example and comparative Example were set respectively in a burn-in evaluation device, and under thermostat condition at 60° C. for 1 hour, while superimposing voltages of 5V-60 Hz, the same picture was output, and then the panels were set respectively as a liquid crystal light valve for green color in a projection display device as shown in FIG. 4. Thereby, whether burn-in is generated or not in the projected screen was observed with bare eyes.

The results are shown in the following Table. 1.

TABLE 1

| | Constitutional material of oblique-deposited film | Alignment film of TFT substrate side | Alignment film of counter substrate | Time until the abnormal display is generated | Observation results of burn-in phenomenon |
|---|---|---|---|---|---|
| Example 1A | $SiO_2$ | 2-propanol + 1-octanol | 2-propanol | 9.2 | ○ |
| Example 2A | | 1-octanol | 2-propanol | 8.3 | ○ |
| Example 3A | | 2-propanol + 1-octanol | ethanol + 2-propanol | 9.8 | ○ |
| Comparative Example 1A | | 2-propanol | 2-propanol | 1.0 | Δ |
| Comparative Example 2A | | 1-octanol | 1-octanol | 8.2 | x |
| Example 1B | $Al_2O_3$ | 2-propanol + 1-octanol | 2-propanol | 10.0 | ○ |
| Example 2B | | 1-octanol | 2-propanol | 9.1 | ○ |
| Example 3B | | 2-propanol + 1-octanol | ethanol + 2-propanol | 10.5 | ○ |
| Comparative Example 1B | | 2-propanol | 2-propanol | 1.0 | Δ |
| Comparative Example 2B | | 1-octanol | 1-octanol | 9.0 | x |

In Table 1, the time until the display defect is generated on the liquid crystal panel of Comparative Example 1A was set at "1.0", and the time until the display defect is generated on the liquid crystal panels of Examples 1A to 3A and Comparative Example 2A were shown in relative values, respectively. Furthermore, the time until the display defect is generated on the liquid crystal panel of Comparative Example 1B was set at "1.0", and the time until the display defect is generated on the liquid crystal panels of Examples 1B to 3B and Comparative Example 2B were shown in relative values, respectively.

In addition, the evaluation on the burn-in was carried out as no burn-in represented by "○", the case of having small burn-in represented by "Δ" and the case of having a large degree of burn-in represented by "X".

As shown in Table. 1, it became clear that the times until the display defect is generated on the liquid crystal panels of Examples 1A to 3A are all longer than that of Comparative Example 1A and that the times until the display defect is generated on the liquid crystal panels of Examples 1B to 3B are all longer than that of Comparative Example 1B.

Also, it became clear that all the liquid crystal panels of Examples 1A to 3A and 1B to 3B are not apt to generate burn-in. Contrarily, it became clear that all the liquid crystal panels of Comparative examples 1A, 2A, 1B and 2B generated burn-in in short time.

The entire disclosure of Japanese Patent Application No.2005-178964, filed Jun. 20, 2005 is expressly incorporated by reference herein.

What is claimed is:

1. A liquid crystal panel comprising:
   a first substrate;
   a driving element on the first substrate;
   a second substrate which opposes to the first substrate;
   a first alignment film which is provided on the driving element;
   a second alignment film which is provided on the second substrate; and
   a liquid crystal layer which is interposed between the first alignment film and the second alignment film;
   wherein the first alignment film and the second alignment film are formed by an oblique deposition method, and are formed by chemically bonding alcohols to a hydroxyl group which exists on at least a surface of an inorganic oxide film having a plurality of micropores, and
   the average molecular weight of alcohols of the first alignment film is larger than the average molecular weight of alcohols of the second alignment film.

2. The liquid crystal panel according to claim 1,
   wherein the average molecular weight of alcohols of the first alignment film is 100 to 400.

3. The liquid crystal panel according to claim 2,
   wherein the first alignment film mainly has an alcohol having 6 to 30 carbon atoms.

4. The liquid crystal panel according to claim 1,
   wherein the average molecular weight of alcohols of the second alignment film is 32 to 70.

5. The liquid crystal panel according to claim 4,
   wherein the second alignment film mainly has an alcohol having 1 to 4 carbon atoms.

6. The liquid crystal panel according to claim 1,
   wherein in both the first alignment film and the second alignment film, the alcohols are chemically bonded to a hydroxyl group which exists in an inner surface of the micropores of the inorganic oxide film.

7. The liquid crystal panel according to claim 1,
   wherein at least one of the alcohol of the first alignment film and the alcohol of the second alignment film are bonded from a plurality of alcohols in a treatment solution.

8. The liquid crystal panel according to claim 1,
   wherein any one of the alcohol of the first alignment film and the alcohol of the second alignment film are bonded from a plurality of types of alcohols in a first treatment solution, the other is bonded from one type of alcohol in a second treatment solution, and
   the first treatment solution includes a same type of alcohol in the second treatment solution.

9. The liquid crystal panel according to claim 1,
   wherein the alcohol of the first alignment film is bonded from a plurality of types of alcohols in a first treatment solution and the alcohol of the second alignment film is bonded from a plurality of types of alcohols in a second treatment solution, and
   the first treatment solution includes a same type of alcohol in the second treatment solution.

10. An electronic apparatus comprising the liquid crystal panel according to claim 1.

* * * * *